United States Patent [19]

Alary et al.

[11] Patent Number: 5,592,821
[45] Date of Patent: Jan. 14, 1997

[54] GAS TURBINE ENGINE HAVING AN INTEGRAL GUIDE VANE AND SEPARATOR DIFFUSER

[75] Inventors: Jean-Paul D. Alary, Saint Maur des Fosses; Gérard Y. G. Barbier, Morangis; Corine G. Delahaye, Mormant; Jacques G. W. R. Havard, Moissy Cramayel; Paul Mackovic, Villiers S/Marne; Bruno R. H. Masse, Vaux le Penil; Didier Merville, Breuillet; François J.-P. Mirville, Hericy; Serge R. Y. Muccioli, Boulogne; Denis J. M. Sandelis, Nangis; Ralph M. Stelter, Lesigny, all of France

[73] Assignee: Societe Nationale D'Etude et de Construction de Moteurs F'Aviation S.N.E.C.M.A., Paris, France

[21] Appl. No.: 523,908

[22] Filed: Sep. 6, 1995

Related U.S. Application Data

[63] Continuation of Ser. No. 255,922, Jun. 7, 1994, abandoned.

[30] Foreign Application Priority Data

Jun. 10, 1993 [FR] France .................................... 93 06956

[51] Int. Cl.$^6$ ........................................................ F02C 1/00
[52] U.S. Cl. ........................... 60/751; 60/747; 415/208.1; 415/210.1
[58] Field of Search .............................. 60/744, 747, 749, 60/751, 39.36; 415/83, 208.1, 210.1

[56] References Cited

U.S. PATENT DOCUMENTS

| | | | |
|---|---|---|---|
| 2,308,685 | 1/1943 | Hagen | 415/210.1 |
| 2,704,089 | 6/1952 | Woodworth | 415/208.1 |
| 2,720,080 | 10/1955 | Oulianoff et al. | 60/751 |
| 3,299,632 | 1/1967 | Wilde et al. | 60/746 |
| 3,631,674 | 1/1972 | Taylor | 60/751 |
| 3,652,184 | 3/1972 | Conrad . | |
| 3,704,075 | 11/1972 | Karstensen . | |
| 3,750,397 | 8/1973 | Cohen et al. | 60/751 |
| 3,910,035 | 10/1975 | Juhasz et al. | 60/751 |
| 4,194,359 | 3/1980 | Brookman et al. | 60/39.36 |
| 4,416,111 | 11/1983 | Lenahan et al. | 60/39.75 |
| 5,077,967 | 1/1992 | Widener et al. | 415/208.1 |
| 5,311,743 | 5/1994 | Ansart et al. | 60/747 |

FOREIGN PATENT DOCUMENTS

| | | | |
|---|---|---|---|
| 0485175 | 5/1992 | European Pat. Off. . | |
| 1925172 | 11/1970 | Germany . | |
| 0246233 | 6/1987 | Germany | 60/751 |
| 1211534 | 11/1970 | United Kingdom . | |
| 2004329 | 3/1979 | United Kingdom . | |

*Primary Examiner*—Timothy Thorpe
*Assistant Examiner*—Ted Kim
*Attorney, Agent, or Firm*—Bacon & Thomas

[57] ABSTRACT

A separator-diffuser for a gas turbine engine is disclosed wherein the diffuser includes axial walls which function as a guide vane stage for the oxidizer compressor. By incorporating the last, or downstream, guide vane stage into the diffuser structure, the overall axial length and bulk of the gas turbine engine may be significantly reduced. The separator-diffuser has a wall defining a generally annular oxidizer flow passage extending around the central axis of the gas turbine engine, the passage having an oxidizer inlet located downstream of the last rotor stage of the oxidizer compressor so as to enable the oxidizer to pass from the oxidizer compressor into the oxidizer flow passage. A generally annular separator member is located in the oxidizer flow passage downstream of the oxidizer inlet so as to divide the oxidizer flow passage into at least two separate oxidizer flow paths, each flow path having a separate oxidizer outlet. The oxidizer outlets are positioned so as to direct the oxidizer towards one of the annular array of fuel injection heads. A plurality of circumferentially spaced apart, axially extending primary arms connect the separator member to the diffuser walls so as to support the separator within the oxidizer passageway and to serve as a guide vane stage for the oxidizer emanating from the oxidizer compressor.

10 Claims, 4 Drawing Sheets

GAS TURBINE ENGINE HAVING AN INTEGRAL GUIDE VANE AND SEPARATOR DIFFUSER

This application is a Continuation of application Ser. No. 08/255,922, filed Jun. 7, 1994 now abandoned.

BACKGROUND OF THE INVENTION

The present invention relates to a separator-diffuser for a gas turbine engine, more particularly such a separator-diffuser having integral guide vanes.

Axial flow gas turbine engines typically comprise an oxidizer compressor consisting of a plurality of rotor wheels with a plurality of vane stages interposed between the rotor wheels. The guide vane stages guide the oxidizer flow into a generally axial flow path and through a diffuser which directs the oxidizer towards one or more fuel injection heads so that the oxidizer may be mixed with the fuel and ignited in a combustion chamber. In such gas turbine engines utilized as turbojet aircraft engines, it is known to provide two or more radially spaced, generally annular fuel injection head arrays which extend in annular fashion around the central axis of the turbojet engine. As is well known in the art, one annular array of fuel injection heads is used under low power conditions, while the other array of fuel injection heads is utilized in full power operating modes.

To ensure proper distribution of the oxidizer, typically air, a diffuser is located between the last guide vane stage and the fuel injection head arrays in order to direct portions of the oxidizer towards each of the annular arrays of fuel injection heads. Such known diffusers are located downstream of the final guide vane stage and upstream of the fuel injection heads. The oxidizer passing through the diffuser may also be directed such that portions bypass the fuel injection heads and, in known fashion, feeds the primary air zone of the combustion chamber and cools the walls of the combustion chamber.

SUMMARY OF THE INVENTION

A separator-diffuser for a gas turbine engine is disclosed wherein the diffuser includes axial walls which function as a guide vane stage for the oxidizer compressor. By incorporating the last, or downstream, guide vane stage into the diffuser structure, the overall axial length and bulk of the gas turbine engine may be significantly reduced. Furthermore, reducing the length between the high pressure stages of the oxidizer compressor and the combustion chamber enables the reduction in length between bearings of the high pressure unit, thereby reducing the load on the bearing when the structure is utilized in an aircraft turbojet engine while the aircraft is maneuvering. The structure according to the present invention also eliminates degradation of the oxidizer flow due to turbulence occurring between the guide vane stage and the diffuser.

The separator-diffuser has a wall defining a generally annular oxidizer flow passage extending around the central axis of the gas turbine engine, the passage having an oxidizer inlet located downstream of the last rotor stage of the oxidizer compressor so as to enable the oxidizer to pass from the oxidizer compressor into the oxidizer flow passage. A generally annular separator member is located in the oxidizer flow passage downstream of the oxidizer inlet so as to divide the oxidizer flow passage into at least two separate oxidizer flow paths, each flow path having a separate oxidizer outlet. The oxidizer outlets are positioned so as to direct the oxidizer towards one of the annular array of fuel injection heads. A plurality of circumferentially spaced apart, axially extending primary arms connect the separator member to the diffuser walls so as to support the separator within the oxidizer passageway and to serve as a guide vane stage for the oxidizer emanating from the oxidizer compressor. Each of the primary arms has an upstream portion extending beyond the upstream edge of the separator towards the oxidizer compressor having an aerodynamic cross-sectional configuration to act as a guide vane. The cross-sectional configuration of the primary arms is similar to that of known guide vanes and serves to reduce turbulence of the oxidizer flowing through the oxidizer passage.

A plurality of secondary arms may also interconnect the separator member to the diffuser walls and one or more of these secondary arms may be circumferentially located between adjacent primary arms. The axial lengths of the secondary arms are the same as the axial length of the separator member such that the leading and trailing edges of each of the secondary arms are generally coincident with the leading and trailing edges of the separator member. Again, the secondary arms have an aerodynamic cross-sectional configuration in order to minimize turbulence in the oxidizer flow paths.

More than one separator member may be utilized in order to divide the oxidizer passage into three or more oxidizer outlets. One of the walls of the diffuser may define an oxidizer tap so as to withdraw a portion of the oxidizer flowing through the oxidizer passage to serve other aircraft needs, such as cabin pressurization, or starting of the turbojet engine.

The separator-diffuser according to this invention guides the oxidizer outlet flow from the downstream rotor stage of the oxidizer compressor so as to be in a generally axial direction along the longitudinal axis of the engine. The structure is such that it minimizes overall pressure losses in the pressurized oxidizer between the high pressure compressor outlet and the first stage of the high pressure turbine located downstream of the combustion chamber. The device also enhances the flow stability of the oxidizer flow while at the same time enabling the reduction of the bulk and overall dimensions of the turbojet engine. The present invention also assumes the structural function previously carried out by the combustion chamber-diffuser casing by transmitting the stresses from the turbine nozzles through the casing vane.

DETAILED DESCRIPTION OF THE PREFERRED EMBODIMENTS

Figure 1:
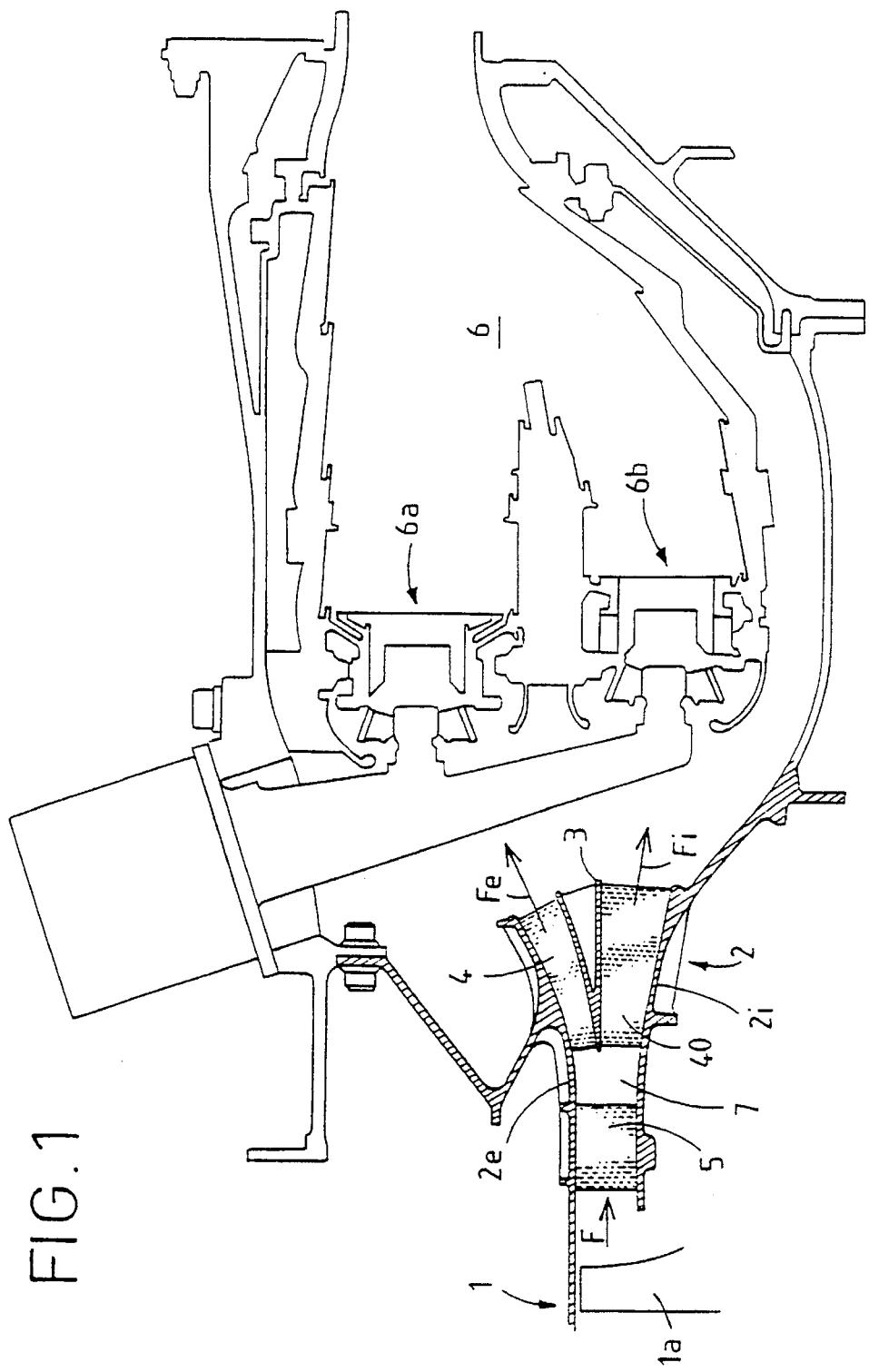
FIG. 1 is a partial, cross-sectional schematic view of a gas turbine engine combustion chamber, diffuser and compressor stage typical of the prior art devices.

FIG. 1 illustrates a typical, dual fuel injection head combustion chamber 6 of a known turbojet engine having a central longitudinal axis 10. The last, or most downstream rotor stage 1a of the high pressure oxidizer compressor 1 is illustrated in its position upstream (towards the left as viewed in FIG. 1) of the annular combustion chamber 6. The final, or downstream stage 1a is followed by a stage of stationary guide vanes 5 and by an annular diffuser 2. Diffuser 2 comprises an outer wall 2e, and an inner wall 2i between which is defined an oxidizer flow passage. A generally annular separator 3 is located downstream of the guide vane stage 5, but upstream of the combustion chamber 6, and is attached to the outer and inner walls 2e and 2i respectively by generally radially extending structural arms 4 and 40. From the high pressure oxidizer flow F, the separator 3 produces two oxidizer flow paths Fe which directs oxidizer toward the low power fuel injection head 6a, and oxidizer flow Fi towards the high power fuel injection head 6b. As is well known in the art, the fuel injection heads 6a and 6b may be arranged in radially spaced apart, annular arrays about central axis 10.

Figure 2:
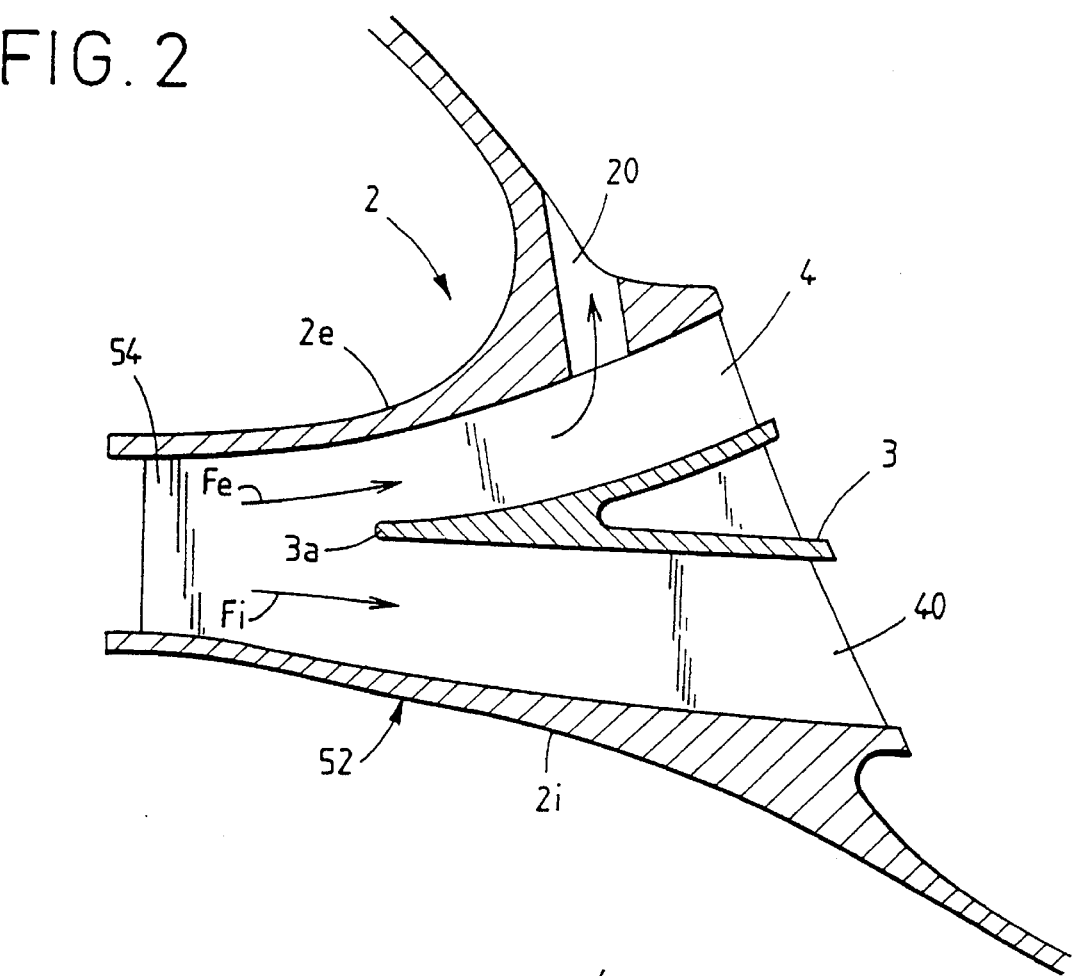
FIG. 2 is a cross-sectional view of a first embodiment of the separator-diffuser according to the present invention.
Figure 3:
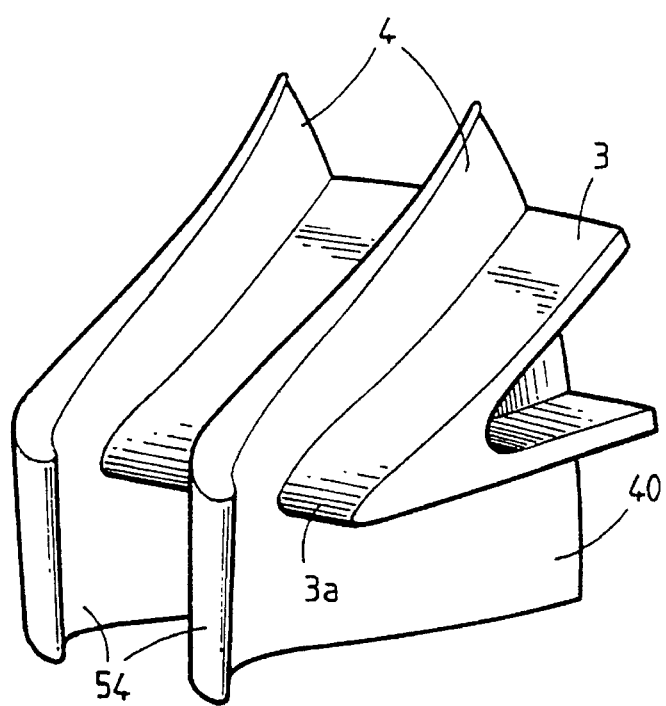
FIG. 3 is a partial, perspective view of the separator-diffuser, illustrated in FIG. 2.

The known separator diffuser structure 2, 3 illustrated in FIG. 1 is downstream of the guide vane stage 5 so as to define a free space 7. In the present invention, this free space 7 is eliminated and the separator-diffuser structure 52, 3, illustrated in FIGS. 2 and 3, replaces the separate guide vane stage 5 and the separator diffuser 2, 3. In the present invention, the guide vane stage 5 is integrated with the separator-diffuser structure 52, 3 thereby reducing the overall axial length between the combustion chamber fuel injection heads 6a and 6b, and the final compressor stage 1a. The structural arms 4, 40, as illustrated in FIGS. 2 and 3, serve to connect separator member 3 to the walls 2e and 2i, respectively, but also have leading edge portions 54 which extend upstream of the leading edge portion 3a of the separator 3. The primary arms 4 and 40, as well as their upstream portions 54 have an aerodynamic cross-sectional configuration similar to known guide vane cross-sections in order to eliminate the turbulence imparted to the oxidizer flow through the separator-diffuser according to the invention.

As best seen in FIG. 2, the wall 2e may define one or more orifices 20 located circumferentially between adjacent primary arms 4 so as to direct a portion of the oxidizer outwardly in the vicinity of the separator 3. This portion of the tapped oxidizer may be utilized for aircraft cabin pressurization, or may be utilized to power engine accessories.

Figure 4:
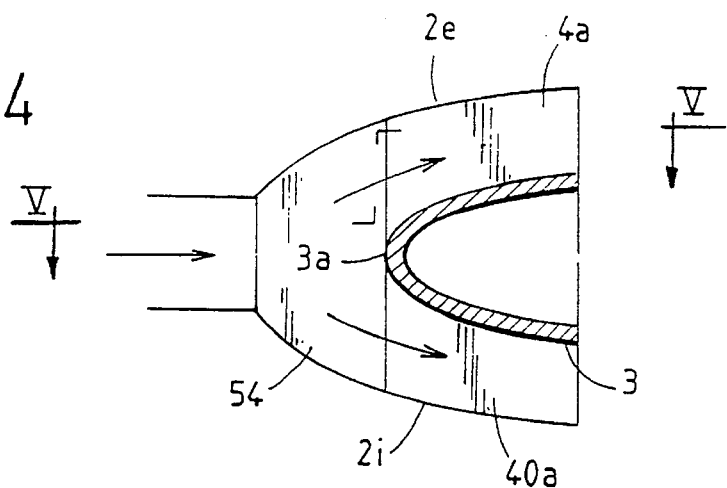
FIG. 4 is a partial, side cross-sectional view of a second embodiment of the separator-diffuser according to the present invention.
Figure 5:
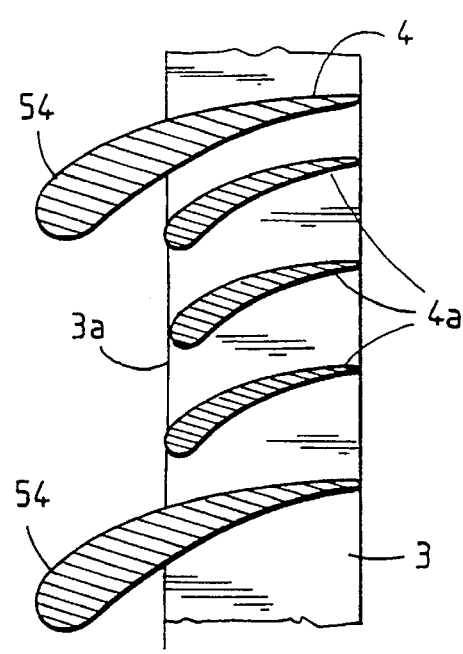
FIG. 5 is a cross-sectional view taken along line V—V in FIG. 4.
Figure 6:
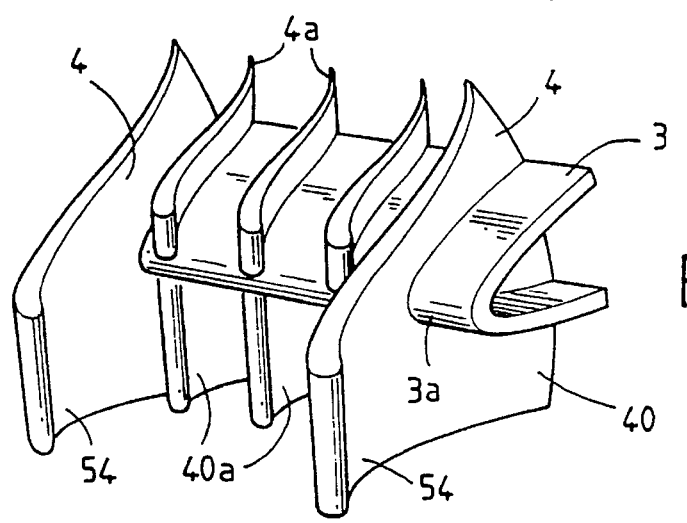
FIG. 6 is a partial, perspective view of the separator-diffuser illustrated in FIGS. 4 and 5.

The embodiment illustrated in FIGS. 4–6 is generally similar to that previously described, but incorporates a plurality of secondary arms 4a and 40a circumferentially interposed between adjacent primary arms 4 and 40, respectively. These secondary arms 4a and 40a have axial dimensions substantially the same as the axial dimension of the separator 3 such that the leading or upstream edges of the arms 4a and 40a are generally coincident with the upstream edge 3a of the separator 3. Similarly, the trailing or downstream edges of the secondary arms 4a and 40a are generally coincident with the downstream edge of the separator 3. As in reference to FIG. 1, the upstream direction is toward the left and the downstream direction is toward the right.

The secondary arms 4a and 40a also have aerodynamic cross-sectional configurations so as to guide the oxidizer flowing through the oxidizer passage while imparting a minimum of turbulence to the oxidizer flow. As with the primary arms, the secondary arms 4a and 40a also extend between the separator 3 and the inner and outer walls 2e and 2i and extend generally radially from the central axis 10.

Figure 7:
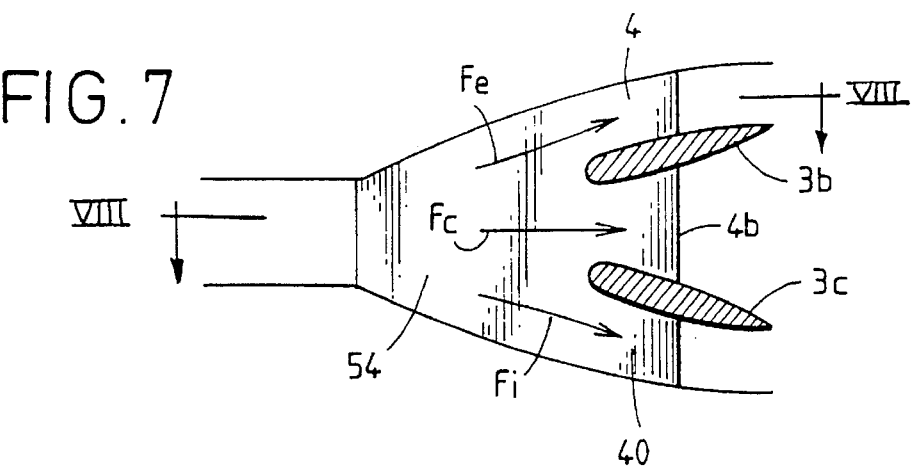
FIG. 7 is a partial, side cross-sectional view of a third embodiment of the separator-diffuser according to the present invention.
Figure 8:
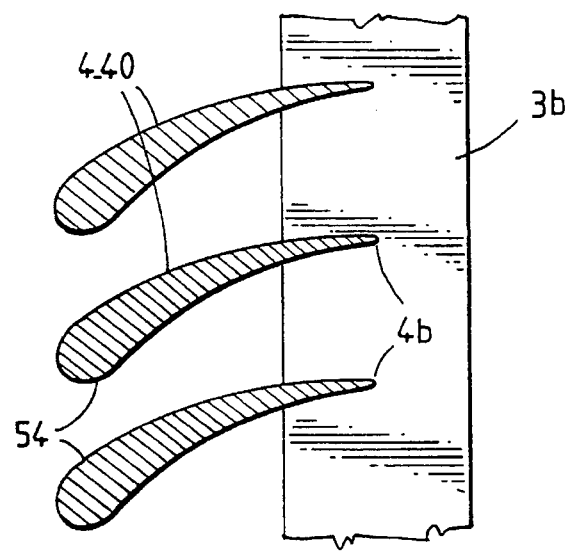
FIG. 8 is a cross-sectional view taken along line VIII—VIII in FIG. 7.
Figure 9:
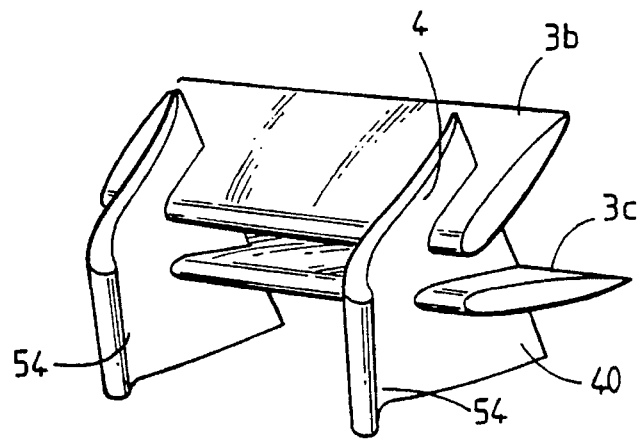
FIG. 9 is a partial, perspective view of the separator diffuser illustrated in FIGS. 7 and 8.

In certain circumstances, it may be desirable to divide the oxidizer flow into more than two oxidizer paths, which may be accomplished by the embodiment of the present invention illustrated in FIGS. 7–9. In this embodiment, two separator members 3b and 3c are utilized, the positions of the separators being such that they divide the oxidizer passageway into an external oxidizer flow path Fe, a central oxidizer flow path Fc and an inner oxidizer flow path Fi. The downstream edge portions of the separators 3b and 3c may extend in a downstream direction beyond the trailing or downstream edges 4b of the primary arms 4 and 40. As in the two previous embodiments, however, the upstream portions 54 of the primary arms 4 and 40 extend upstream beyond the upstream edges of the separators 3b and 3c to act as a guide vane stage. Again, the primary arms assume aerodynamic cross-sectional configurations to guide the oxidizer flow with minimal turbulence.

The separator-diffuser according to the present invention may be molded or cast as a integral unit, or may be formed from separate elements and mechanically attached together such as by welding or brazing. Also, the separator and the support arms may be formed as an integral unit, such units being illustrated in FIGS. 3, 6 and 9, with this annular unitary structure subsequently welded or brazed to the inner and outer walls to form the separator diffuser.

The foregoing description is provided for illustrative purposes only and should not be construed as in any way limiting this invention, the scope of which being defined solely by the appended claims.

What is claimed is:

1. An integral guide vane and separator-diffuser for a gas turbine engine having a central axis, at least two radially spaced annular rows of fuel injection heads disposed around the central axis and an oxidizer compressor located upstream of the at least two annular rows of fuel injection heads, the compressor having at least one rotor, the separator-diffuser comprising:

a) wall means defining a generally annular oxidizer flow diffuser passage around the central axis having an oxidizer inlet located downstream of the at least one rotor so as to enable oxidizer to pass from the at least one rotor into the oxidizer flow diffuser passage;

b) at least one generally annular separator member located in the oxidizer flow diffuser passage downstream of the oxidizer inlet so as to divide the oxidizer flow diffuser passage into at least two separate oxidizer flow paths each having a separate oxidizer outlet to direct oxidizer toward the at least two rows of fuel injection heads, the separator member having an upstream leading edge portion;

c) a plurality of circumferentially spaced apart, generally axially extending primary guide vane arms connecting the separator member to the wall means, the primary guide vane arms having integral leading edge portions extending upstream beyond the upstream leading edge portion of the at least one separator member so as to form the sole stationary guide vanes adjacent to at least one said rotor so as to guide the oxidizer flow from the compressor, each primary guide vane arm having an axial length measured along the central axis greater than an axial length of the at least one annular separator member;

d) a first trailing edge defined by the separator member; and, e) second trailing edges defined by the primary guide vane arms and located such that the second trailing edges are adjacent to the first trailing edge.

2. The integral guide vane separator-diffuser of claim 1 further comprising a plurality of circumferentially spaced apart, generally axially extending secondary arms connecting the separator member to the wall means, at least one secondary arm being located between adjacent primary guide vane arms wherein each secondary arm has a leading edge portion substantially aligned with the leading edge portion of the separator member.

3. The integral guide vane separator-diffuser of claim 2 further comprising:

third trailing edges defined by the secondary arms and substantially aligned with the first trailing edge.

4. The integral guide vane separator-diffuser of claim 2 comprising a plurality of secondary arms disposed between each pair of adjacent primary guide vane arms.

5. The integral guide vane separator-diffuser of claim 1 further comprising an oxidizer tap defined by the wall means to direct a portion of the oxidizer from the oxidizer flow path externally of the integral guide vane separator-diffuser.

6. The integral guide vane separator-diffuser of claim 1 wherein the plurality of primary guide vane arms are integral with at least one said separator member.

7. The integral guide vane separator-diffuser of claim 1 wherein the plurality of primary guide vane arms are each fastened to the at least one separator member by welding.

8. An integral guide vane and separator-diffuser for a gas turbine engine having a central axis, at least two radially spaced annular rows of fuel injection heads disposed around the central axis and an oxidizer compressor located upstream of the at least two annular rows of fuel injection heads, the compressor having at least one rotor, the separator-diffuser comprising:

a) wall means defining a generally annular oxidizer flow diffuser passage around the central axis having an oxidizer inlet located downstream of the at least one rotor so as to enable oxidizer to pass from the at least one rotor into the oxidizer flow diffuser passage;

b) a plurality of generally annular separator members located in the oxidizer flow diffuser passage downstream of the oxidizer inlet, each separator member having an upstream leading edge portion wherein N number of separator members divide the oxidizer flow diffuser passage into N+1 oxidizer flow paths having N+1 oxidizer outlets to direct oxidizer toward the at least two rows of fuel injection heads;

c) a plurality of circumferentially spaced apart, generally axially extending primary guide vane arms connecting the separator members to the wall means, the primary guide vane arms having integral leading edge portions extending upstream beyond the upstream leading edge portion of the separator member so as to form the sole stationary guide vanes adjacent to the at least one rotor so as to guide the oxidizer flow from the compressor, each primary guide vane arm having an axial length measured along the central axis greater than an axial length of the plurality of annular separator members;

d) a first trailing edge defined by the separator member; and, e) second trailing edges defined by the primary guide vane arms and located such that the second trailing edges are adjacent to the first trailing edge.

9. The integral guide vane separator-diffuser of claim 8 further comprising:

a) a trailing edge defined by each of the primary guide vane arms; and, b) a trailing edge defined by each of the separator members located downstream from the trailing edge defined by each of the primary guide vane arms.

10. The integral guide vane separator-diffuser of claim 8 wherein the separator members extend obliquely to each other in an axial direction.

* * * * *